United States Patent Office 3,328,295
Patented June 27, 1967

3,328,295
METHOD FOR PREVENTING DIFFERENTIAL STICKING AND REDUCING FLUID LOSS
James L. Lummus and Arthur Park, Tulsa, Okla., assignors to Pan American Petroleum Corporation, Tulsa, Okla., a corporation of Delaware
No Drawing. Filed Dec. 3, 1964, Ser. No. 415,801
1 Claim. (Cl. 252—8.5)

The present invention is concerned with a method for freeing drill pipe from a well. More particularly, it is concerned with an improved procedure for freeing drill pipe stuck against the well face by means of the differential pressure between the drilling mud cake and the formation.

Frequently, in drilling operations, particularly at depths in excess of 10,000 to 12,000 feet, the drill pipe becomes stuck and cannot be rotated or removed from the hole. In any hole where the mud pressure is substantially higher than the formation fluid pressure, a mud cake forms opposite the permeable section of the hole and a flow of filtrate passes through the mud cake and into the formation, thus thickening the mud. It has been previously observed that a pressure differential from the well bore to a permeable formation covered with mud cake can hold the pipe next to the well bore wall with great force. This occurs when a portion of the pipe rests against the wall of the well, imbedding itself in the filter cake. The area of the drill pipe in contact with the cake is thus sealed off from the full hydrostatic pressure of the mud column. The pressure difference between the mud column pressure and the formation pressure acts on the area of drill pipe in contact with the mud cake to hold the pipe against the wall of the hole. The degree to which this phenomenon occurs depends on a number of factors, such as mud weight, the permeability of the formation, the area of contact of the pipe with the mud cake, fluid loss properties of the mud, the time that the pipe remains in contact with the thickened filter cake, etc.

It has previously been suggested that surface-active agents be employed in drilling muds to solve the problem of differential sticking. In our investigation, however, we found that the kind of surface-active material capable of solving this problem is very limited. The fact that a certain composition possesses excellent surface-active properties is not necessarily any criterion that it will function satisfactorily in the freeing of differentially stuck drill pipe. For example, a good additive for our purposes should (1) be highly compatible with bentonite and other components of drilling muds, (2) show good stability at temperatures up to about 350° F., (3) be resistant to solids contamination, and (4) reduce gel strength and viscosity.

While substantial improvements have been made in the recent past relating to anti-differential sticking agents and to methods for freeing stuck drill pipe from the wellbore wall, the compositions presently available for this purpose leave much to be desired. For example, gas is frequently encountered in drilling operations tending to form foam when such agents are incorporated in the drilling mud, resulting in a marked decrease in mud density. The presence of such gas can be very troublesome and difficult to cope with owing to the bubbles formed by agitation of the mud column with the rising gas. This means that if such conditions persist, a substantial length of the mud column will be of low density, thereby increasing the danger of a blow-out. To correct or avoid this difficulty, foam inhibitors were added and although the foaming problem was controlled, the over-all effectiveness of the anti-differential sticking agent was reduced owing to properties imparted to the mud by the defoamer. Thus, in some instances, the force required to pull the pipe out of the wellbore increased as much as 100 percent. Also, the fluid loss in such cases was observed to increase substantially.

While oil base muds have been employed with success in overcoming the problem of differential sticking, it should be pointed out that the quantity of such materials required to solve the problem is much greater than is necessary in the case of surfactants of our invention. Thus, where an oil base mud is used to free differentially stuck pipe, it must be spotted in the well in an amount sufficient to extend from the bottom to a level slightly above the location where the sticking occurs. In other words, nothing but oil base mud is used in the well up to a level at least as high as the uppermost point of differential sticking.

Accordingly, it is an object of our invention to provide a class of anti-differential sticking agents compatible with conventional drilling muds and which, when incorporated in these muds, results in a very substantial reduction in the force required to free wall-stuck pipe as compared to similar situations employing commercial anti-differential sticking agents. It is a further object of our invention to provide a class of anti-differential sticking materials which, when added to conventional drilling muds, will not cause the latter to foam objectionably. It is another object of our invention to provide a class of materials which are not only useful active anti-differential sticking agents, but which also have the ability to lower substantially the fluid loss of drilling muds.

In carrying out our invention, we either spot a mud containing a compound, or a mixture of compounds, claimed herein opposite the section of stuck drill pipe, or we add said compound, or mixture of compounds, to the mud while drilling through sections where differential sticking is expected. The compounds we have found to be operable for this purpose comprise a relatively small class of alkyl aryl sulfonic acid amine salts having the following general formula:

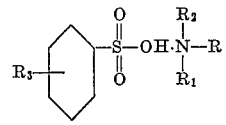

wherein R represents an aliphatic group having from 2 to 5 carbon atoms, $R_1$ and $R_2$ may be hydrogen or an aliphatic group of from 2 to 5 carbon atoms, and $R_3$ is a kerosene hydrocarbon residue or an alkyl group having from 10 to 13 carbon atoms.

As examples of such compounds there may be mentioned the diisopropyl amine salt of tridecyl benzene sulfonic acid, butyl amine salt of dodecyl benzene sulfonic acid, triethyl amine salt of dodecyl benzene sulfonic acid, amyl amine salt of tridecyl benzene sulfonic acid, diisopropylamine salt of keryl benzene sulfonic acid, etc. Also, compounds having highly desirable anti-differential sticking properties are prepared from the abovementioned amines and linear (straight chain) alkyl benzene sulfonates in which the alkyl group has from 10 to 13 carbon atoms.

This additive may be employed in amounts ranging from about 0.2 to about 25 lbs./bbl. drilling mud, preferably from about 3 to about 10 lbs./bbl. The additive may, of course, be used in concentrations greater than those stated; however, no appreciable benefit is generally produced by the presence of such increased amounts. In determining whether or not compounds of the type mentioned above would serve as suitable anti-differential sticking agents, we tested them in the apparatus and in accordance with the procedure described in the Oil and Gas Journal, vol. 60, No. 48, pages 62 to 66. In this article, there is a device disclosed which simulates bottom-hole conditions. The equipment used is capable of withstanding 3,000 p.s.i. and temperatures up to 400° F. A replaceable Alundum disk simulates a permeable formation and a ⅞" diameter by 3" long rod simulates a section of pipe or collar. A linkage allows the pipe to be twisted before it is pulled from the filter cake. Thus, it is possible to apply torque similar to practices used to free pipe in the field.

In testing the performance of these surface-active agents under drilling conditions, a differential pressure of 500 p.s.i. was applied for 5 minutes across the interface between the mud and the formation. The drill pipe was next forced against the resulting mud cake for a period of 10 minutes. Thereafter, the amount of force (in pounds) required to free the stuck pipe was measured.

The problem of dealing with the phenomenon of differential sticking can be approached from either of two ways. If the drill pipe is stuck, a batch of heavy mud, for example 16 pounds per gallon, containing 3 to 10 pounds per barrel of surface-active agent, may be run down the drill pipe and back up the annulus to a level slightly above the highest point in the hole where sticking occurs. Force is then applied to the pipe by attempting to rotate it or work it free. Usually within 18 to 36 hours the pipe is free.

These additives may also be used in the mud as a preventative for differential sticking, in which case the agent is incorporated in the mud system during circulation in a concentration of from about 2 to about 10 pounds per barrel. This concentration of agent should be maintained in the mud system. The addition of more agent to the mud should be made when the fluid loss exceeds the original value by about 2 to 3 cc. for 30 minutes, as determined by the standard API test. Gradual additions of the surfactant are made until the fluid loss value is reduced to the desired level.

The effectiveness of a particular sulfonic acid amine salt as an anti-differential sticking agent was not only based on the ease with which stuck pipe is removed from the well wall in the presence of mud containing such agent, but on the fluid loss characteristics, foaming properties and viscosity stability as well. To rate these compounds we devised the following formula:

$$R = (P/O + \tfrac{1}{2} F/L) - [\tfrac{1}{2}(AV + PV) + F]$$

where $R$ = rating
$P/O$ = percent reduction in differential sticking
$F/L$ = percent reduction in API fluid loss
$AV$ = percent increase in apparent viscosity
$PV$ = percent increase in plastic viscosity
$F$ = eighths of inch of foam found after stirring a quantity amounting to one laboratory barrel (350 cc.) in a cylindrical container 3 inches in diameter.

Ratings of the order of 75 to 100 are considered excellent while those of 25 to 50 are rated as fair to good. In substantially all cases, however, it will be seen from the information below that muds containing the additives of our invention were superior to those employing a commercial anti-differential sticking agent.

In the table below, the effectiveness of the compounds of our invention as anti-differential sticking agents and fluid loss reducers is compared with a material currently used in the field to improve anti-differential sticking and fluid loss characteristics of the drilling mud. These tests were carried out with both weighted and unweighted field muds in accordance with the procedure described above. The unweighted muds had a density of from about 10 to 11 lbs./gal. whereas the weighted mud had a density of 16 lbs./gal. The heavy mud contained a viscosity dispersing agent such as chrome or ferro chrome lignin salts plus sufficient caustic to dissolve the lignin salts. Such muds generally have a density of at least 12 lbs./gal. and have a pH usually in the range of 8–13. They may also contain a weighting agent, such as galena, to bring the weight of the mud up to a maximum of about 20–25 lbs./gal.

TABLE

| No. | Additive | 16 lb./gal. Field Mud | | | 11 lb./gal. Field Mud | | | 10 lb./gal. Field Mud | | |
|---|---|---|---|---|---|---|---|---|---|---|
| | | R | P/O | F/L | R | P/O | F/L | R | P/O | F/L |
| 1 | Commercial Product | 36 | 17 | 39 | | 44 | 28 | 13 | 6 | 21 |
| 2 | Diisopropyl Amine Salt of Keryl Benzene Sulfonic Acid | 83 | 51 | 65 | | 74 | 31.5 | 21 | 18 | 17 |
| 3 | Diisopropyl Amine Salt of a linear alkylated [1] Benzene Sulfonic Acid | 58 | 30 | 50 | | | | 46 | 35 | 31 |
| 4 | Diisopropyl Amine Salt of linear Dodecyl Benzene Sulfonic Acid | 34 | 42 | 20 | | | | 43 | 41 | 17 |
| 5 | 50% active Additive No. 3 (5% $H_2O$) | 38 | 35 | 35 | | | | 39 | 35 | 17 |
| 6 | Butyl Amine Salt of Keryl Benzene Sulfonic Acid | 48 | 33 | 30 | | | | | | |
| 7 | Butyl Amine Salt of Dodecyl Benzene Sulfonic Acid | 41 | 41 | 0 | | | | | | |
| 8 | do | 42 | 23 | 39 | | | | | | |
| 9 | Triethyl Amine Salt of Keryl Benzene Sulfonic Acid | 52 | 26 | 52 | | | | | | |
| 10 | Triethyl Amine Salt of Tridecyl Benzene Sulfonic Acid | 64 | 43 | 43 | | 53 | 31.5 | | | |
| 11 | Triethyl Amine Salt of Dodecyl Benzene Sulfonic Acid | 54 | 28 | 52 | | | | | | |
| 12 | Diisopropyl Amine Salt of Tridecyl Benzene Sulfonic Acid | 38 | 33 | 10 | | 54 | 28 | | | |
| 13 | Diisopropyl Amine Salt of Dodecyl Benzene Sulfonic Acid | 46 | 20 | 52 | | | | | | |
| 14 | Amyl Amine Salt of Keryl Benzene Sulfonic Acid | 38 | 36 | 4 | | 50 | 39 | | | |
| 15 | Amyl Amine Salt of Tridecyl Benzene Sulfonic Acid | 41 | 23 | 37 | | | | | | |
| 16 | Amyl Amine Salt of Dodecyl Benzene Sulfonic Acid | 40 | 30 | 21 | | | | | | |
| 17 | Combination of Equal Parts of Additives 2, 10 and 14 | | 71 | 67 | | 87 | 51 | | | |

[1] Alkyl group of from 10 to 13 carbon atoms.

The behavoir of the above additives has been found to vary rather widely with the particular mud employed and with the age of such mud. However, in general, we have found that the relative efficiency of the additives listed remains about the same. It should also be pointed out that it is ordinarily possible to decrease the amount of additive employed without sacrificing to any great extent the efficiency of the mud system. Thus, for example, in the case of additives 3 and 5, the former was diluted with isopropyl alcohol so that the active component was present in a concentration of about ½ of its original content. This material was a heterogeneous mixture, but was rendered homogeneous by the addition of 5 percent water (additive No. 5). Even diluted to the extent of 50 percent, it will be seen that in differential sticking properties it was still twice as good as the commercial product used for this purpose and was about equal to it with respect to fluid loss characteristics. Although additive No. 13 is structurally similar to the other compounds claimed herein, it possesses a property unique from the rest of these materials in that it produces no foam when added to drilling mud. It should be pointed out, however, that the other compounds of this class do not generally produce foam to an objectionable extent or to a degree which cannot readily by controlled in a known manner. In the case of low solids muds the beneficial effect of the anti-differential sticking agents is not so pronounced. However, it is apparent from the data in the above table that the reduction in differential sticking properties was substantially greater with the compounds of our invention than that obtained with the commercially available material.

We claim:

A clay base drilling fluid adapted for preventing or overcoming the occurrence of differentially stuck drill pipe in a well bore, said fluid ranging in density from about 8.5 to 25 lbs. per gallon, having incorporated therein from about 0.5 to about 25 lbs. (per barrel of said fluid) of a mixture consisting essentially of substantially equal parts of the diisopropyl amine salt of keryl benzene sulfonic acid, the triethylamine salt of tridecyl benzene sulfonic, and the amyl amine salt of keryl benzene sulfonic acid.

References Cited

UNITED STATES PATENTS

| | | | |
|---|---|---|---|
| 2,283,199 | 5/1942 | Flett | 252—353 X |
| 3,099,624 | 7/1963 | Wilson | 252—8.5 |
| 3,105,046 | 9/1963 | Fischer | 252—8.5 |
| 3,217,802 | 11/1965 | Reddie et al. | 252—8.55 |
| 3,223,622 | 12/1965 | Lumms et al. | 252—8.5 |

OTHER REFERENCES

Helmick et al., Pressure-Differential Sticking of Drill Pipe, article in the Oil and Gas Journal, June 17, 1957, pages 132 to 136.

Schwartz et al., Surface Active Agents, vol. 1, published 1949 by Interscience Publishers, Inc., New York, pages 122 and 123.

LEON D. ROSDOL, *Primary Examiner.*

H. B. GUYNN, *Assistant Examiner.*